United States Patent [19]

Fox

[11] Patent Number: 5,317,634
[45] Date of Patent: May 31, 1994

[54] TELEPHONE SUBSET ARRANGEMENT

[75] Inventor: Ronald C. S. Fox, Randwick, Australia

[73] Assignee: Alcatel N.V., Amsterdam, Netherlands

[21] Appl. No.: 691,004

[22] PCT Filed: Nov. 17, 1989

[86] PCT No.: PCT/AU89/00493
§ 371 Date: Jun. 19, 1991
§ 102(e) Date: Jun. 19, 1991

[87] PCT Pub. No.: WO90/00783
PCT Pub. Date: Jul. 12, 1990

[30] Foreign Application Priority Data

Dec. 23, 1988 [AU] Australia ............................ PJ 2096

[51] Int. Cl.[5] .................................................. H04M 3/00
[52] U.S. Cl. ...................................... 379/362; 379/387
[58] Field of Search .................. 379/387, 362, 368, 413

[56] References Cited

U.S. PATENT DOCUMENTS

| | | | |
|---|---|---|---|
| 4,008,380 | 2/1977 | LaBorde | 379/368 |
| 4,815,126 | 3/1989 | Goode et al. | 379/359 |
| 4,847,899 | 7/1989 | Hikada | 379/413 |
| 5,031,212 | 6/1991 | Saji et al. | 379/362 |

FOREIGN PATENT DOCUMENTS

| | | |
|---|---|---|
| 13449/88 | 11/1988 | Australia . |
| 61-264953 | 11/1986 | Japan . |
| 87/00717 | 1/1987 | PCT Int'l Appl. . |
| 88/08234 | 10/1988 | PCT Int'l Appl. . |
| 2021357 | 11/1979 | United Kingdom . |
| 2182527 | 5/1987 | United Kingdom . |

Primary Examiner—James L. Dwyer
Assistant Examiner—Paul A. Fournier
Attorney, Agent, or Firm—Robbins, Berliner & Carson

[57] ABSTRACT

A telephone circuit subset arrangement in which the base/emitter junction of a switching transistor (TR1) coupling an internal battery (B1) to the dialler chip's power terminals (VDD, VSS) is shunted by hook-switch signal contacts (HS) when the subset is brought into the off-hook mode, thereby turning the switching transistor off and disconnecting the battery. The circuit is so arranged that upon the switching transistor turning off, three auxiliary switching transistors (TR3, TR4 and TR5) turn on and operate the subset's line switch to connect line current to the dialler chip's power terminals. A network of resistors (R1, R2 and R3) associated with the switching transistor (TR1) ensure that on the one hand sufficient current is available to turn on the auxiliary switching transistors, and on the other hand limit the current to a magnitude which dose not cause excessive battery discharge while the subset is off-hook.

5 Claims, 1 Drawing Sheet

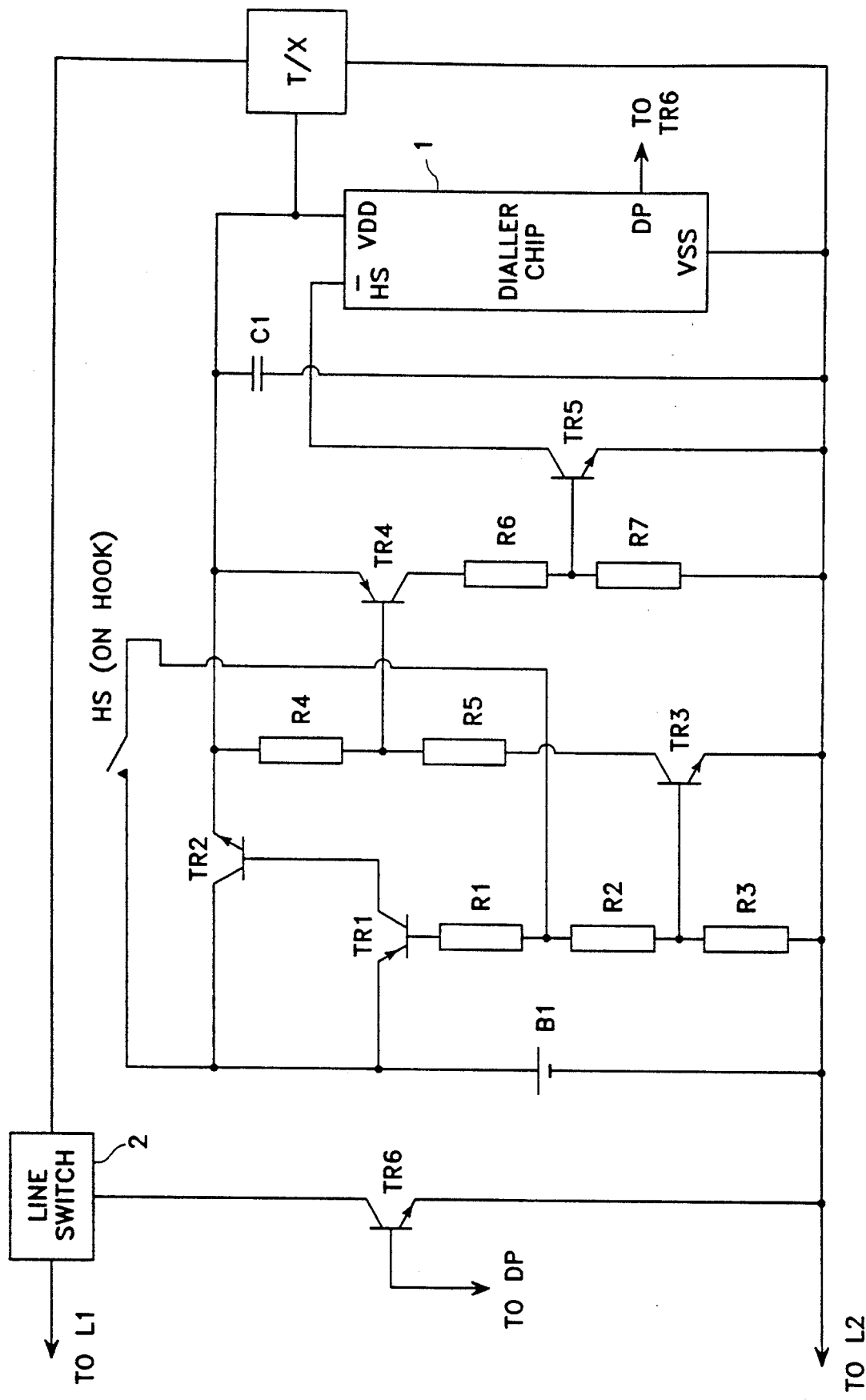

TELEPHONE SUBSET ARRANGEMENT

TECHNICAL FIELD

This invention relates to telephone subsets and in particular to low voltage telephone subsets incorporating a dialler chip and an electronic line switch.

BACKGROUND ART

The electronic line switch fulfils a number of functions including the hook-switch function, that is, the line switch acts as a hook-switch when a hook-switch control signal is selectively applied to the line switch, a hook-switch control signal being generated when the user brings the subset into the off-hook mode. This control signal may be provided by a ten number repertory tone/pulse dialler chip or a microprocessor.

In a subset provided with a dialler chip and a conventional mechanical hook-switch, the dialler chip is provided with its operating power from current derived from the exchange battery and drawn over the exchange line through the hook-switch. As soon as the subset is brought into the off-hook mode the hook-switch contacts operate and adequate operating voltage is extended to the dialler chip which is then able to function.

In the case of a subset provided with an electronic line switch, however, when such a subset is initially connected to the exchange line, or reconnected after subsequently being un-plugged, the dialler chip is without power because its power source is cut off by the line switch which it controls. Consequently the dialler chip cannot function and the line switch cannot be signalled.

A known method by which the dialler chip of such a subset is provided with power is described in the specification of PCT/AU88/00046 (corresponding to commonly assigned U.S. application Ser. No. 07/377,830, now abandoned). This specification disclosed an arrangement wherein a storage capacitor provides a current source for the dialler chip. The arrangement is such that initially, with the capacitor discharged, upon connection of the subset's line terminals to the exchange line. Current flows via a circuit to cause a first transistor to switch on thereby rendering the subset's electronic line switch conducting. The capacitor is charged via the operated line switch until the voltage level across the capacitor reaches the minimum operation voltage of the dialler chip. A control circuit then switches off the first transistor and hence the line switch.

This known arrangement, however, is not satisfactory for providing power to the dialler chip in a lower voltage phone, and particularly low voltage phones in parallel, because of the low voltage at the phone line terminals.

Another known arrangement for providing power to the dialler chip is a bleed circuit around the line switch to bleed sufficient current from the exchange line in the on-hook mode. With low voltage subsets, particularly parallel low voltage subsets, the bleed current required to power the dialler chips would exceed the allowable on-hook current allowed by some telecommunication authorities.

A solution to the problem of providing power to the dialler chip in the on-hook mode is to provide the power with a dry cell. An undesirable feature of this solution, however, is the necessity to replace the cell when its capacity falls due to discharge. If the discharge is kept to a minimum, the cell life will be greatly extended.

DISCLOSURE OF INVENTION

It is therefore an object of the present invention to provide a dry cell switching arrangement for disconnecting a dry cell providing power to the dialler chip of a subset when the subset is in the off-hook mode.

The inventive concept of the present invention is to provide a switching arrangement to disconnect a dry cell providing power to the subset's dialler chip during the "off-hook" mode, the arrangement using minimal power.

According to the invention there is provided a telephone subset circuit arrangement comprising first and second line terminal means for respectively connecting to conductors of an exchange line, a transmission circuit means connected between said line terminal means, a line switch means whose switching element is formed by a conductive path of a first controllable semi-conductor switch means having a control element coupled to a first output of a control means associated with the transmission circuit means, said switching element being serially in the subset circuit's loop current circuit, said control means having power terminal means for applying energizing power to enable said control means, wherein energy from a battery means associated with said subset is connected to said power terminal means via a conductive path of a second controllable semiconductor switch means when the subset is in the on-hook mode, and wherein when the subset is in the off-hook mode, hook-switch means render said second controllable semiconductor switch means non-conducting thereby disconnecting said battery means from said power terminal means, and rendering a third controllable semiconductor switch means conducting, said third controllable semiconductor means applying signal means to hook-switch signal input means of said control means, said control means thereupon producing a line switch signal to render said line switch's semiconductor switching element conducting, said power terminal means being thereby coupled via the transmission circuit means to said first and second line terminal means.

BRIEF DESCRIPTION OF DRAWINGS

In order that the invention can be readily understood, an embodiment thereof will now be described in relation to the FIGURE of the drawing, which is a schematic circuit incorporating the present invention.

BEST MODE FOR CARRYING OUT THE INVENTION

Referring to the drawing there is shown a schematic circuit of part of a low voltage telephone subset. The circuit comprises a ten number repertory tone/pulse dialler chip 1 having a dial pulse output DP, a power terminal VDD, a common voltage rail terminal VSS and a hook switch input $\overline{HS}$; an electronic line switch 2 serially connected between the L1 line terminal (not shown) and the transmission circuit (TX), and the line switch control transistor TR6; a lithium 3 V dry cell B1; a hook switch signal contact HS; a storage capacitor C1 connected across VDD and VSS, the positive terminal of battery B1 is connected to the emitter element of transistor TR1 whose base element is connected to the common voltage rail via three serially connected resistors R1, R2 and R3; the collector element of a PNP transistor TR1 is connected to the base element of an NPN transistor TR2 whose emitter is connected to VDD of dialler chip 1; the junction of resistor R2 and R3 is connected to the base element of an NPN transistor TR3 whose collector is connected to the base element of a PNP transistor TR4 via resistor R5; the collector of PNP transistor TR4 is connected to the base element of an NPN transistor TR5 via resistor R6; the collector of transistor TR5 is connected to $\overline{HS}$ of dialler chip 1; signal contact HS is connected across the positive terminal of battery B1 and the junction of resistors R1 and R2; VSS is coupled to the L2 terminal (not shown) of the subset.

In operation, in the on-hook mode, the hook switch signal contacts HS are open and transistor TR1 is turned on by current provided by battery B1 through its emitter/base junction and resistors R1, R2, R3. Transistor TR2 is turned on by current from battery B1 via the emitter/collector junction of transistor TR2. The collector/emitter junction of transistor TR2 connects the positive terminal of battery B1 to the VDD terminal of dialler chip 1 to maintain the chip's memory. In this condition the dialler chip typically draws 1.0 UA. Storage capacitor C1 is quickly charged by current drawn from battery B1 via the collector/emitter junction of transistor TR2. The charge on C1 maintains the chip's memory during impulse dialling.

When the subset is placed in the off-hook mode, signal contacts HS close and effectively shunt transistor TR1 and resistor R1. Transistor TR1 and TR2 turn off. The current through resistors R2 and R3 increases causing transistor TR3 to now turn on, which in turn causes transistors TR4 and TR5 to turn on. When transistor TR5 turns on terminal $\overline{HS}$ of dialler chip 1 is rendered LOW, this causes terminal DP to go HIGH. Terminal DP is connected to the base element of line switch control transistor TR6 which is turned on by the changed condition on terminal DP. Transistor TR6 renders line switch 2 conducting and dialler chip 1 is now powered by current from the exchange line via the line switch and the transmission circuit.

The values of resistors R2 and R3 must be such that on the one hand sufficient current must be available to turn on transistor TR3, and on the other hand limit the current to a magnitude which does not cause excessive battery discharge. Typically, this current should be approximately 1.0 UA.

While the present invention has been described with regard to many particulars it is understood that equivalents may be readily substituted without departing from the scope of the invention.

I claim:

1. A telephone subset circuit arrangement comprising
   first and second line terminals for respectively connecting the subset to first and second conductors of an exchange line,
   a transmission circuit connected between said first and second line terminals,
   a loop current circuit,
   a battery, and
   a line switch circuit further comprising
   control means associated with the transmission circuit and having power terminal means for applying energizing power to enable said control means and hook-switch signal input means responsive to a control signal for thereupon producing a line switch signal,
   first controllable semiconductor switch means responsive to said line switch signal and having a control element coupled to a first output of said control means and a conductive path forming a switching element in series with said loop current circuit,
   second controllable semiconductor switch means for, when the subset is in an on-hook mode, connecting energy from said battery to said power terminal means,
   third controllable semiconductor switch means for applying said control signal to said hook-switch signal input means, and
   hook-switch means for, when the subset is in the off-hook mode, rendering said second controllable semiconductor switch means non-conducting to thereby disconnect said battery from said power terminal means, and rendering said third controllable semiconductor switch means conducting to thereby couple said power terminal via the transmission circuit to said first and second line terminals.

2. An arrangement as claimed in claim 1, wherein
   said second controllable semiconductor switch means further comprises
   a first transistor,
   a second transistor arranged in a complementary configuration with said first transistor, and
   a resistance in series with a junction of said second transistor, and
   a conductive path of said first transistor connects energy from said battery to said power terminal means upon being rendered conducting by said second transistor by current flowing from said battery means across said junction.

3. An arrangement as claimed in claim 2, wherein when the said subset is in the off-hook mode,
   said hook switch means short circuits said junction and a predetermined part of said resistance,
   said second semiconductor switching means is rendered non-conducting and,
   said current increases by a predetermined magnitude to render said third semiconductor switch means conducting.

4. An arrangement as claimed in claim 3, wherein said resistance further comprises
   a first resistor,
   a second resistor, and
   a third resistor,
   said first, second and third resistors are coupled in series with said second resistor between said first and third resistors,
   the distal end of the first resistor is connected to a control element of said second transistor and
   the distal end of said third resistor is connected to a pole of said battery,
   a junction between the first resistor and the second resistor is connected to a terminal of said hook-switch means, and
   a junction between the second resistor and the third resistor is coupled to a control element of the third controllable semiconductor switch means.

5. An arrangement as claimed in claim 1, wherein a capacitive storage means is connected across said power terminal means.

* * * * *